Figure 1:
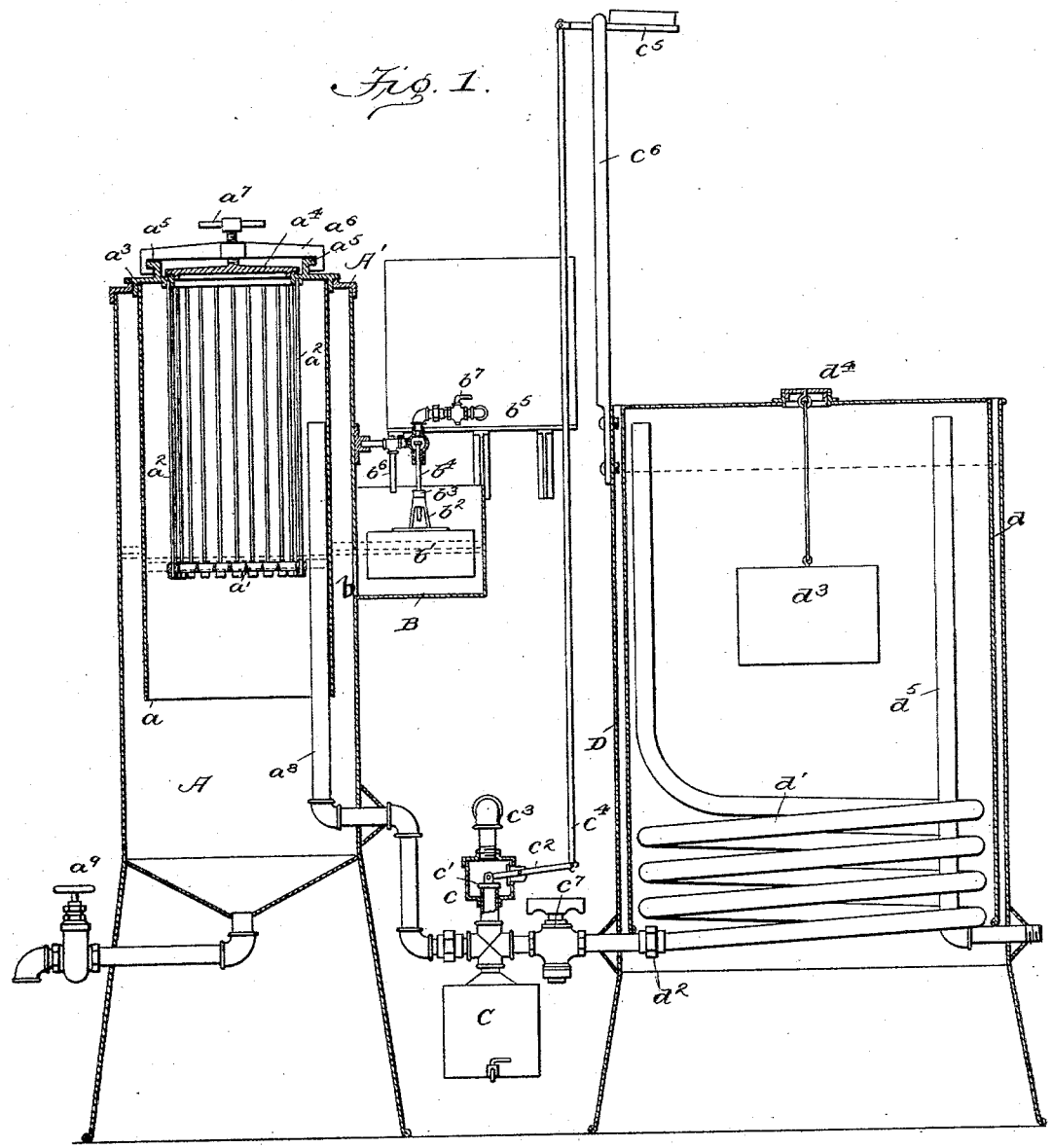

(No Model.) 2 Sheets—Sheet 2.

J. LEEDE.
ACETYLENE GAS APPARATUS.

No. 597,291. Patented Jan. 11, 1898.

WITNESSES:
G. H. Stockbridge
G. M. Copenhaver.

INVENTOR
Julius Leede
BY T. D. Stockbridge
ATTORNEY.

UNITED STATES PATENT OFFICE.

JULIUS LEEDE, OF MINNEAPOLIS, MINNESOTA.

ACETYLENE-GAS APPARATUS.

SPECIFICATION forming part of Letters Patent No. 597,291, dated January 11, 1898.

Application filed December 28, 1896. Serial No. 617,227. (No model.)

*To all whom it may concern:*

Be it known that I, JULIUS LEEDE, a citizen of the United States, residing at Minneapolis, in the county of Hennepin and State of Minnesota, have invented certain new and useful Improvements in Gas Apparatus; and I do hereby declare the following to be a full, clear, and exact description of the invention, such as will enable others skilled in the art to which it appertains to make and use the same.

My invention relates to apparatus for generating acetylene gas from calcium carbid.

The object of the invention is to provide an efficient automatic apparatus for decomposing calcic carbid and for maintaining a constant pressure in the gas-holder.

Heretofore generators have been devised for obtaining acetylene gas from calcium carbid wherein water is supplied for the decomposition in a small stream or drop by drop, and when the maximum of pressure in the holder has been reached the flow of water is cut off. Under this process the decomposition does not stop when the flow is arrested, because the lime which forms the residue is more or less saturated with water not yet decomposed. It follows that only such quantity of carbid can be used at a charge as will generate a volume of gas within the capacity of the gas reservoir or holder; otherwise an undue or variable pressure is developed. In another type of generators the charge of carbid is dropped into a body or volume of water. In still another type the carbid is suspended from the inverted vessel constituting a part of a gas-holder and adjusted so that it will be partially submerged in water and automatically withdrawn therefrom as the pressure within is too great.

The object of my invention is to automatically supply water to a generator containing calcic carbid and to automatically drive the water away from the carbid and thus check or stop the generation of the gas whenever internal pressure in the generator and holder becomes greater than four and-one half tenths of a U-gage or other predetermined pressure.

The invention consists in the instrumentalities and combinations hereinafter described and claimed, whereby when a given pressure—say four and one-half tenths of a U-gage—is exceeded in the generator and the holder the water in the generator is driven away from a stationary body of carbid suspended in the generator.

By means of this invention I am enabled to check or arrest the generation of gas whenever the pressure rises above the normal or predetermined point and to resume the operation whenever it falls below normal, and thus obtain a constant pressure at the burners.

The preferred form of my invention embraces a water-supply, a main water-chamber of any suitable shape having an annular ring at the upper end, a bell or cylinder open at the lower end within the main water-chamber extending some distance below the waterline supported by said ring, a carbid-cage suspended within the bell or cylinder, an outlet-pipe extending from the upper part of the inclosed bell or cylinder down through the lower end of the main water-chamber, a safety-valve, a drip-chamber for condensed residuum, a worm-condenser, and a gas reservoir or holder. The main water-supply has interposed between it and the generating-chamber an auxiliary water-chamber containing a float, by means of which the supply from the main tank is regulated through the medium of a valve.

The bell of the gas-holder has suspended within it and submerged in water a vessel open at the top to receive such weight as required to insure a predetermined pressure in the holder—say four and one-half to five tenths of a U-gage. When the movable part of the gas-holder rises, the bell or suspended vessel leaving the water augments the weight of the top of the holder and opposes any increased pressure in the holder and generator and will thereby cause the water in the lower part of the generating-chamber to recede from the carbid and rise in the water-chamber and the auxiliary water-chamber containing the float. The gas-holder has an outlet-pipe extending from the upper part thereof downward through the lower end to connect with a service pipe or main.

Figure 2:
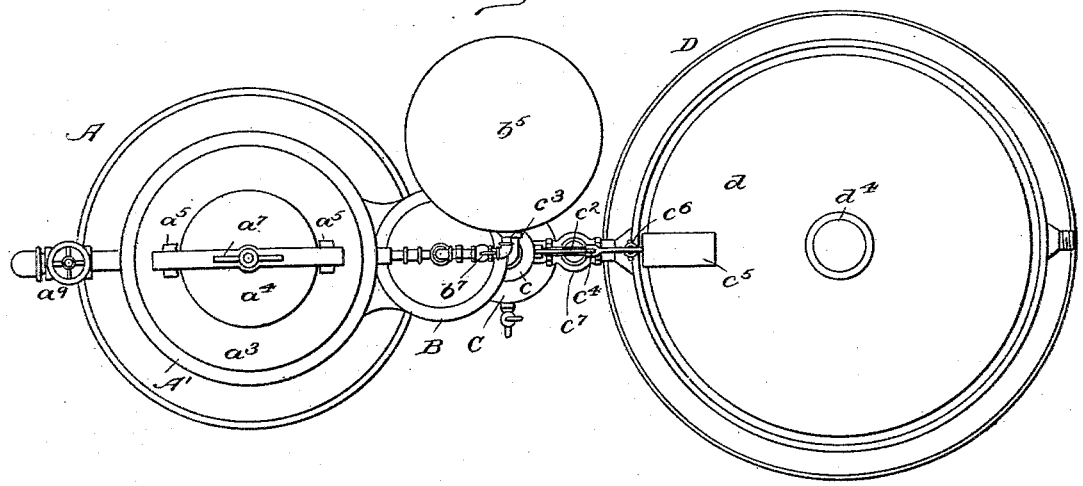
Figure 3:
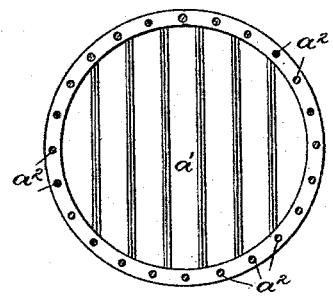

In the drawings, Figure 1 is a vertical central section showing the water-chamber, generating-chamber, carbid-cage, auxiliary tank, and its valve connection with the main water-tank, also a safety-valve in section, drip-chamber, stop-cock, and pipe connecting with the gas-holder, a gas-holder, a weighted vessel, and an outlet-pipe. Fig. 2 is a plan of my apparatus. Fig. 3 is a plan of the carbid-cage grate.

A is the main water-chamber, and A' is the annular supporting-ring. $a$ is the cylinder, open at a bell or lower end. This cylinder is securely fastened to the plate $a^3$ and, surrounding the carbid-cage and outlet-pipe, forms the generating-chamber. The carbid cage or holder consists of a bottom or grate $a'$, screw-rods $a^2$, and plate $a^3$.

The cover $a^4$ for the carbid-cage and the cylinder $a$ is provided with a suitable gasket and is held firmly in place through the medium of ears or lugs $a^5$, bar $a^6$, and hand-screw $a^7$.

$a^8$ is the gas-outlet pipe, and $a^9$ the valve for drawing off the lime residue.

B is the auxiliary water-chamber, communicating through opening $b$ with main chamber A. The float $b'$ is coupled with yoke $b^2$, carrying valve-stem $b^4$, secured in desired adjustment by lock-nut $b^3$. Through this adjustment the water-line may be regulated within certain limits to submerge or surround the carbid to a greater or less extent, and thus regulate the capacity of the generator. The valve on stem $b^4$ regulates the flow of water from main tank $b^5$ through $b^6$ to the auxiliary tank B. A stop-cock to cut off the water is shown at $b^7$.

C is the drip-chamber for collecting the condensations from worm $d'$ and is provided with a cock for drawing off from time to time.

$c$ is a safety-valve chamber having disk $c'$, forked lever $c^2$, outlet $c^3$, connecting-rod $c^4$, forked lever, and weight $c^5$, pivoted on upright $c^6$, which is bolted to gas-holder D.

$C^7$ is a cock to confine gas in the holder when the carbid-cage is being charged.

$d$ is the inverted cylinder or bell of the gas-holder; $d'$, the condensing worm or coil; $d^2$, a union; $d^3$, a bucket or vessel open at the top and connected with screw-cap $d^4$.

The gas-outlet pipe to connect with service-pipe is shown at $d^5$. In use the gas-holder is filled with water to within about four inches of the top. The vessel $d^3$ is weighted sufficiently to produce the desired pressure and attached to the screw-cap $d^4$. Then the bell or inverted cylinder of the holder is put in position. The vessel should be submerged, as shown in the drawings. The main water-chamber A is meantime filled very nearly up to the bottom of the carbid-cage, when the cock $b^7$ is closed. Carbid is introduced, and the cover $a^4$ is secured in place. Cock $c^7$ is turned to open communication with the gas-holder. Cock $b^7$ is now gradually opened and water admitted until it reaches the carbid, readily determined by the boiling sound. The flow of water should then be arrested until gas enough has been generated to lift the bell or movable cylinder of the gas-holder a few inches to establish the desired pressure of four and one-half tenths U-gage, after which cock $b^7$ is opened and water permitted to enter until it is arrested by the float-valve. The proper water-line in contact with the carbid is now established, and gas will be continuously generated. The residue from the carbid will fall through the grate and fresh carbid will be brought in contact with the water. The process of making gas will continue until the use of the gas is stopped and the pressure is raised above the normal, at which time the increased pressure drives away the water from the carbid and shuts off further supply, as before described.

The bucket $d^3$, being filled with water, maintains a constant resistance to the internal pressure as long as it is submerged, but gives greatly-increased resistance while being raised out of the water and may be called a "buoyant weight."

Having now described my invention, I claim as new—

1. In gas-making apparatus the combination of a generating-chamber, a water-chamber below said generating-chamber, an exterior water-supply and means arranged outside the chambers for adjusting the normal water-line in the water-chamber to vary the rate of generation of the gas.

2. In an apparatus for making gas, the combination of a gas-generating chamber, a main water-chamber surrounding the generating-chamber, an exterior water-supply and means outside the chambers for adjusting the normal water-line in the water-chamber and thus vary the rate of generation of the gas, substantially as described.

3. In apparatus for making gas, the combination of a water-chamber, a generating-chamber inclosed by the water-chamber, a carbid-cage within the generating-chamber, a gas-holder, a buoyant weight attached to the holder-bell, and pipe connection between the generator and holder, substantially as described.

4. In apparatus for making gas, the combination of a water-chamber, a generating-chamber within the water-chamber, a carbid-cage within the generating-chamber, an exterior water-supply, an adjustable float-valve for establishing the normal water-line, a gas-holder, a buoyant weight attached to the gas-holder bell and a passage between the generator and holder, substantially as described.

In testimony whereof I affix my signature in presence of two witnesses.

JULIUS LEEDE.

Witnesses:
S. R. MANN,
F. V. CLAYTON.